Jan. 21, 1969    J. D. SCHROETER    3,422,674

CONTINUOUS WELL LOGGING APPARATUS

Filed Nov. 22, 1965

INVENTOR.
JOHN D. SCHROETER
BY Elliott & Pastoriza
ATTORNEYS

United States Patent Office 3,422,674
Patented Jan. 21, 1969

3,422,674
CONTINUOUS WELL LOGGING APPARATUS
John D. Schroeter, Ojai, Calif.
(3205 Jade Ave., Bakersfield, Calif. 93306)
Filed Nov. 22, 1965, Ser. No. 509,136
U.S. Cl. 73—153                    1 Claim
Int. Cl. E21b 49/02

ABSTRACT OF THE DISCLOSURE

Apparatus is provided for continuously and simultaneously analyzing a sample of drilling fluid flowing through a mud ditch for the presence of oil content, gas content and electrical resistivity value. The detected amounts in which they are present are simultaneously logged on graphs for visual correlation which move at a rate corresponding with the depths from which the samples are taken.

---

Figure 1:
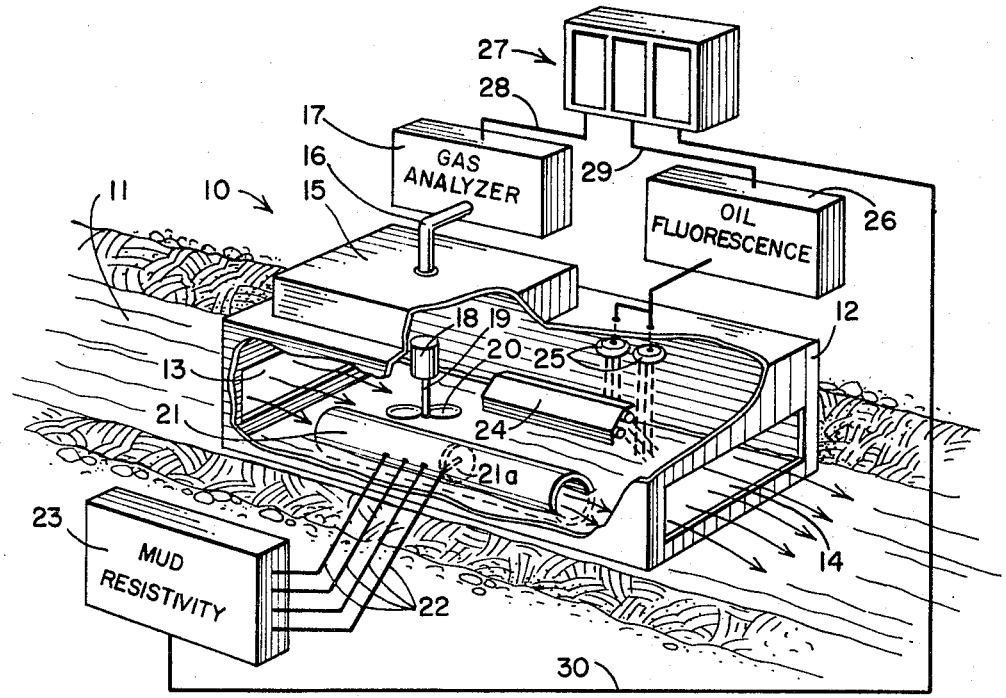

This invention relates generally to well logging and more particularly to an improved method and apparatus for continuously logging a well during drilling.

In conjunction with present well drilling practice, many tests are conducted concurrent with the drilling of the well to determine the probability of drilling into a source of oil or gas. Many of these tests are performed on samples of the drilling fluid taken at intervals during the drilling process.

An example of such a test involves taking a sample of the drilling fluid and viewing the sample in a specially designed viewing box. The box includes a source of ultraviolet light under which crude oil fluoresces and if crude oil is present, it will appear in the form of bright specks on a dark background.

A disadvantage of the foregoing test, along with other tests conducted in a similar manner, is that the tests are run on samples taken at intervals, thereby giving results correlated to only spaced depths of drilling. Consequently, only an incomplete record is obtained of the sub-surface conditions as the drilling proceeds.

Moreover, the above tests require manual collection and processing of the samples which are time consuming and may involve high labor costs.

A further disadvantage of testing by the existing methods is the difficulty in correlating the various test results to the depth of drilling to which the sample corresponds. In other words, to conduct various tests on samples representing a given drilling depth to enable correlation of the samples and insure a complete record of the sub-surface conditions at that particular depth, the various fluid samples must be selected substantially simultaneously.

With the foregoing in mind, it is accordingly a primary object of this invention to provide a method of and apparatus for continuously and automatically logging a well being drilled to the end that continuous information at all depths is available rather than only at intermittent depths.

More particularly, it is an object to continuously log a well being drilled and to automatically and simultaneously record the oil and gas content and the resistivity of the drilling fluid flowing from the well.

Another object is to provide an apparatus for continuously logging a well and providing a record of the results correlated to the depth of penetration of the drilling operation to the end that a complete record of the sub-surface conditions at any given depth of drilling may be readily observed and correlated.

Briefly, these and many other objects and advantages of this invention are attained by providing an apparatus adapted to be positioned in a mud-ditch within which drilling fluid flows from a well being drilled. The apparatus preferably includes analyzer means for detecting the presence of gas within the drilling fluid, means for continuously measuring the resistivity of the drilling fluid flowing through the apparatus, and detection means for continuosuly detecting the presence of oil entrained within the drilling fluid.

The invention further includes a recording means for automatically and simultaneously recording the results of the tests conducted on the drilling fluid. The recording means is preferably arranged such that the results may be quickly and easily observed and correlated with each other at any selected depth of the well.

Figure 2:
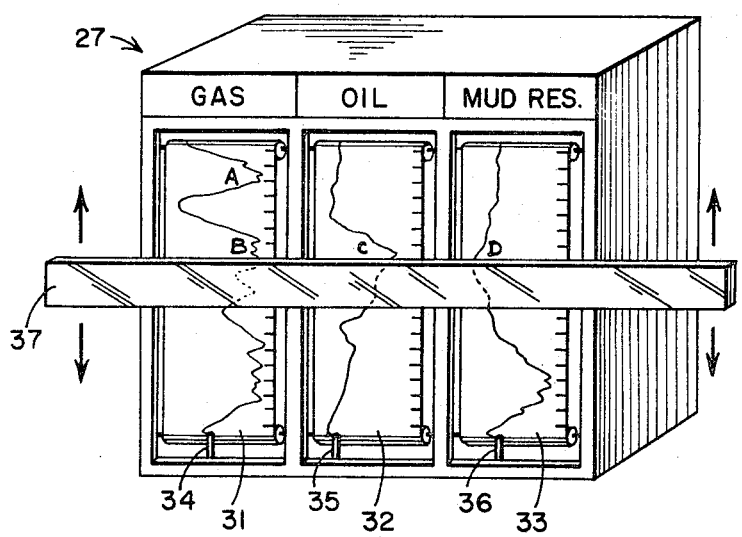

A better understanding of the invention will now be had by referring to a preferred embodiment thereof as illustrated in the accompanying drawings, in which:

FIGURE 1 is a perspective view, partly broken away, of the novel apparatus of this invention installed in operative position; and, FIGURE 2 is an enlarged perspective view of the recording means of this invention.

Referring first to FIGURE 1, there is shown the novel logging apparatus 10 installed in a mud-ditch 11 through which drilling fluid flows from a well being drilled. The logging apparatus includes a housing 12 including an upstream opening 13 and a downstream opening 14 in the end walls thereof. The housing 12 is thus arranged in the mud-ditch such that the drilling fluid flows through the housing 12 in the direction of the arrows as shown.

The logging apparatus 10 includes a gas collection chamber 15 mounted on the top of the housing 12 to which is connected a gas conduit 16 communicating with a gas analyzer 17. Positioned within the housing 12 is a motor 18 adapted to drive a shaft 19 to which is connected an agitating means 20 positioned beneath the surface of the drilling fluid flowing within the housing 12.

A longitudinal tube 21 is positioned within the housing 12 through which a portion of the drilling fluid passes. The tube 21 is adapted to contain a series of electrodes, one of which is shown at 21a, projecting into the drilling fluid and connected respectively to leads 22 extending outwardly therefrom as shown. The leads 22 are connected to a mud resistivity detecting circuit shown at 23.

In accordance with a further feature of the invention, the housing 12 includes a source of ultra-violet light 24 and one or more solar cells 25 connected to an oil fluorescense indicating device 26.

The gas analyzer 17, oil fluorescence detector 26, and the mud resistivity detecting circuit 23 are electrically connected to a recorder means 27 as indicated by the lines 28, 29, and 30, respectively.

Referring now to FIGURE 2, it will be seen that the recording means 27 includes a series of movable graphs 31, 32, and 33 for indicating the gas content, oil content, and resistivity of the drilling fluid, respectively. The movable graphs include recording pens 34, 35, and 36, respectively, for drawing lines on the upwardly moving graphs in accordance with signals received from the logging apparatus. The recording means may include a transparent ruler 37 for purposes which will become clearer as the description proceeds.

In operation and with reference first to FIGURE 1, it will be seen that the housing 12 of the logging apparatus is positioned within the mud-ditch 11 such that the drilling fluid flowing from the well being drilled will flow through the longitudinal extent of the housing 12. The drilling fluid will have absorbed traces of gas, oil, and salt water encountered in the drilling operation, and in accordance with the invention, the gas content, oil content, and electrical resistivity of the drilling fluid are measured and recorded simultaneously.

When the motor 18 is operated, the agitator 20 rotates within the drilling fluid thereby expelling any gas entrained within the drilling fluid upwardly into the gas collection chamber 15. The gas is then conducted through the gas conduit 16 to the gas analyzer 17 which, in turn, provides a signal through the lead 28 to the recorder 27 constituting a function of the content of gas. The amount of gas present will thus be recorded on the graph as shown in FIGURE 2 wherein the greater the amount of gas, the greater the movement of the pen 34 to the right.

The electrical resistivity of the drilling fluid is detected by means of the electrodes positioned within the tube 21. The detecting circuit 23 includes suitable circuits for providing an output signal on the lead 30 constituting a function of the mud resistivity. In the example of the present invention, a high signal on the line 30 indicates small mud resistivity or high mud conductivity, and a low signal indicates high mud resistivity or low mud conductivity. Thus, as shown in FIGURE 2, a measurement of high mud conductivity causes the pen 36 to move towards the right as the graph 31 moves upwardly, thus indicating the probable presence of salt water at the particular depth corresponding to the high reading.

To detect the presence of oil entrained within the drilling fluid, ultraviolet light from the source 24 is emitted towards the drilling fluid and the fluorescence is detected by the solar cells 25. The solar cells are sensitive to a wide spectrum of radiant energy as compared to present photo-detectors and thus constitute an improvement in the fluorescent response signal. This signal from the solar cells is received in the block 26 which in turn provides a signal on line 29 constituting a function of the fluorescent intensity as detected by the solar cells. Thus, as shown in FIGURE 2, the presence of oil within the drilling fluid will cause the recording pen 35 to move towards the right as the graph 32 moves upwardly.

The graphs 31, 32, and 33 are caused to move in time correlation with the rate of drilling of the well and thus the readings on the respective graphs are correlated with the depths to which they relate. Accordingly, any of the recorded measurements may be read for any given depth of the well. For example, and with reference to graph 31, it will be apparent that the gas content is high at the depth indicated at A. The probability of finding gas by means of perforating the well at that depth is relatively high.

More often, however, a complete picture of the conditions at any given depth is only apparent if all the recorded measurements can be read simultaneously. Thus, in accordance with a feature of the invention, the transparent ruler 37 may be positioned horizontally across the graphs on a line corresponding with any given depth, and the three readings easily compared.

In the example shown, the graph 31 indicates high gas content at the depth shown at B. It is further apparent that a high oil content also exists at that depth as shown at C on graph 32. Reference along the ruler to graph 33 indicates a relatively low conductivity or high mud resistivity indicating low salt water content at that depth. As a result of these readings, it is apparent that the probability of finding oil and gas at that depth is relatively high.

From the foregoing, it is apparent that this invention provides an improved method and apparatus for logging a well continuously and automatically and providing simultaneous readings of at least three important sub-surface conditions, all without the necessity of interrupting drilling operations.

Various changes falling within the scope and spirit of this invention will occur to those skilled in the art. The well logging method and apparatus is, therefore, not to be thought of as limited to the specific embodiment set forth.

What is claimed is:

1. An apparatus for continuously logging an oil well being drilled, comprising in combination: an open-ended housing positioned in a stream of drilling fluid flowing from said well; analyzer means coupled to said housing for continuously detecting the presence of gas entrained in said fluid; agitator means in said housing for continuously expelling gas from said fluid into said analyzer means; measuring means in said housing for continuously measuring the electrical resistivity of said fluid, said measuring means including a tubular member through which at least a portion of said drilling fluid flows continuously, said tubular member incorporating electrodes to measure the resistivity; fluorescene indicating means in said housing for detecting the presence of oil contained within said fluid, said fluorescence indicating means including a source of ultraviolet light directed towards said drilling fluid and solar cells responsive to the fluorescence of said fluid engendered by said ultraviolet light; and, recording means coupled to said analyzer means, measuring means, and indicating means for simultaneously recording respectively the gas content, the electrical resistivity, and oil content of said drilling fluid flowing through said housing, and providing a side-by-side display thereof for visual correlation, said recording means being moved with the drilling of said well to correspond to the depth of drilling.

References Cited

UNITED STATES PATENTS

| | | | |
|---|---|---|---|
| 2,206,922 | 7/1940 | Smith | 73—153 X |
| 2,704,658 | 3/1955 | Gordon | 73—153 X |
| 2,740,291 | 4/1956 | Brown | 73—153 |

RICHARD C. QUEISSER, *Primary Examiner.*

J. W. MYRACLE, *Assistant Examiner.*